UNITED STATES PATENT OFFICE 2,493,336

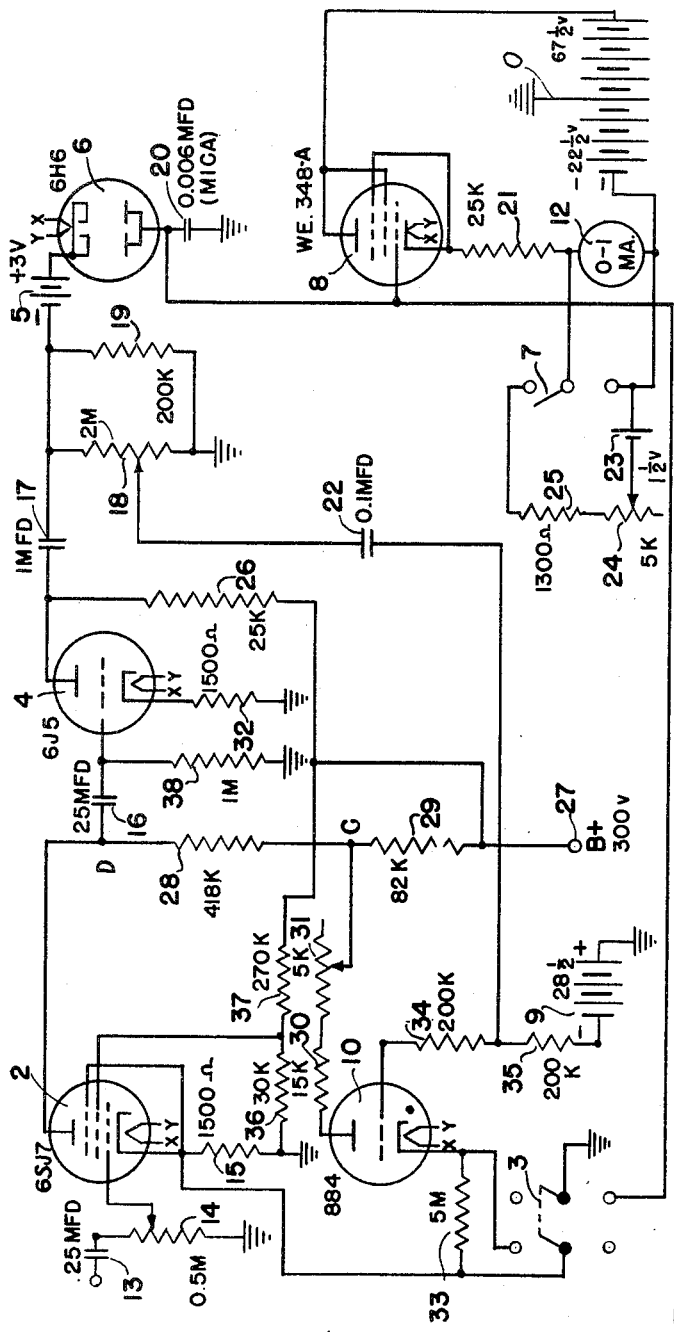

PEAK READING VOLTMETER

Michael J. Burger, Murray Hill, N. J., Russell W. Collins, Monroe, N. Y., and Arthur S. Cosler, Jr., Columbus, Ohio, assignors to the United States of America as represented by the Secretary of the Navy Application September 13, 1946, Serial No. 696,925

9 Claims. (Cl. 171—95)

This invention relates to vacuum tube voltmeters and more particularly to those voltmeters designed to be responsive only to designated portions of incoming signals.

In that type of detection and ranging system which makes use of the time difference of a sound's arrival at two separated detection microphones, for example, it has been found that a corrugation correction should be applied to the time difference readings.

The nature of these received sound waves is such that the first half wave is of negative polarity and the peak value of this first half wave is a measure of the corrugation correction.

It is therefore an object of our invention to provide a circuit including means for indicating in decibels the peak value of a signal having a first half wave of negative polarity.

It is a further object of the invention to provide an indicating galvanometer which is positively protected against overloads.

The phases of this invention which we desire to protect herein are pointed out with particularity in the appended claims. The invention itself together with further advantages and objects thereof can best be understood by reference to the following description taken in conjunction with the accompanying schematic drawing of the circuit elements in proper operative relation to one another.

Referring to the drawing there is shown the schematic circuit of a peak reading voltmeter designed to measure the maximum amplitude of the first half wave of an alternating current signal provided that this first half wave is of negative polarity.

In general, the invention comprises multi-element high vacuum tubes having at least a grid, a plate and a cathode, a gas tube, a meter, switches, power supplies, and a multiplicity of suitable resistors, and condensers in an arrangement, the operation of which will become apparent from my detailed description which follows:

In normal operation of the device, the switch 3 is actuated to its upper, or indicating, position. The lower position is used to reset the circuit after operation as will be hereinafter explained.

Consider first only the action of the circuit on the receipt of the initial negative pulse of received signal which it is desired to measure. This signal is applied to the grid of a tube 2 through a blocking condenser 13 and potentiometer 14 which acts as a variable gain control. The signal is amplified by tube 2 and applied through a blocking condenser 16 to the grid of tube 4. This foregoing produces a signal of negative polarity at the plate of tube 4, which is applied through a blocking condenser 17 to a tube 6 where it is rectified and the D. C. voltage thus obtained charges condenser 20 with a negative charge proportional to the peak voltage of the rectified signal. The charge on this condenser is applied directly to the grid of tube 8 which is designed to operate as a vacuum tube voltmeter measuring the charge on the condenser 20 and indicating its magnitude by a meter 12 placed in the cathode circuit.

The negative voltage at the plate of tube 4 is also applied through a circuit containing a potentiometer 18, coupling condenser 22 and resistor 34 to the grid of a gas tube 10. However, since this tube 10 is normally non-conducting because of the negative grid bias from power supply 9 the negative pulse has no effect on this part of the circuit.

Consider now the positive pulse following the initial negative pulse. The positive pulse is amplified in the same manner as the negative pulse and produces a positive voltage at the plate of tube 4. Since this positive potential will not pass through the rectifier tube 6, there will be no change in the circuit condition beyond this tube.

The positive potential is also applied as aforementioned to the grid of gas tube 10 and will overcome its negative bias sufficiently to trigger the tube and start the flow of plate current. Once the tube starts conducting, it continues to do so until the plate circuit is opened. Subsequent signals of either positive or negative polarity have practically no effect on the plate current flow. This current flows through resistor 15 and acts to increase the grid bias on tube 2 sufficiently beyond cut-off to prevent any subsequent signals from being amplified. Thus, the circuit will measure the first negative pulse and then become inoperative.

In a conventional amplifier of this type, when the tube 2 is biased to cut-off, the plate current falling to zero decreases the voltage drop across the plate resistors 28 and 29 and increases the voltage at the plate of tube 2 thereby producing a pulse of negative polarity. It is important that such a pulse should not be generated as it would alter the charge on the condenser 20 and thereby give erroneous readings.

An elimination network comprising the plate resistors 28 and 30, the potentiometer 31, and the common resistor 29 is provided to prevent the formation of such a pulse.

The resistor 29 is used in the plate circuits of both tubes 2 and 10, and the normal operating potentials at D and C are determined for plate current flow through only tube 2. A sufficient additional resistance 30 and the potentiometer 31 are inserted in the plate circuit of the gas tube 10 to limit the current flowing through it to such a value that the voltage drop produced across the resistance 29 will be exactly equal to the drop across both the resistor 28 and 29 produced by current flow through tube 2. Thus, when the tube 2 is biased to cut-off, the potential at C will change to the same value as that which appeared at D when plate current was flowing only in tube 2 and therefore the potential at B will not change.

This condition is obtained by artificially triggering the gas tube (touching the grid to ground) and adjusting potentiometer 31 until no reading occurs when the tube is triggered. This adjustment is made with the gain control set to zero position to avoid pulse readings due to noise.

The meter 12 in the vacuum tube circuit is so arranged that signals of too great an amplitude will not damage the meter. The current through the cathode circuit of tube 8 is adjusted so that it is exactly 1 ma. when the tube grid is grounded. This current is bucked by another current produced by a battery 23 in series with a resistor 25 and a potentiometer 24, thereby producing a zero reading when the grid of tube 8 is grounded. Voltages of negative polarity will decrease the plate current flow in tube 8 and allow more of the bucking current to flow, thus causing positive readings. Signals of too large an amplitude will stop the plate current flow entirely and allow only the bucking current to flow through the meter.

Once the instrument has been operated, it is necessary to "reset" it before additional measurements can be made. Momentary operation of a reset switch 3 to its down position removes the charge from condenser 20 and untriggers the gas tube 10, thus restoring the circuit to normal operating condition. A resistor 33 is connected across that part of the switch which opens the cathode circuit of tube 10. This permits a leakage path for any charge accumulating on the cathode and thus lessens surge potentials which might retrigger the tube when the switch 3 is actuated to its up position.

Extraneous signals are prevented from disturbing the circuit by means of potentiometer 18 and bias cells 5. The potentiometer 18 is adjusted to prevent the extraneous signals from triggering gas tube 10, and bias cell 5 is provided to prevent such signals from disturbing the meter 12.

Switch 7 is provided to enable adjustment of the various readings of meter 12 and is normally in its upper, or operative, position. In its lower position, it disconnects the battery 23 and protects the meter from mechanical injury by short-circuiting its terminals. Potentiometer 24 is adjustable to obtain the exact current from battery 23 which may be required to balance normal current through the meter 12.

For the purpose of clarity, specific values have been given to the various resistors, capacitors, tubes and power supplies. It is needless to note that numerous modifications may be made without departing from the true spirit and scope of the invention.

Having thus described our invention, what we claim is:

1. In combination with a vacuum tube voltmeter, a circuit responsive to input pulse signals of alternate polarity in which the first half-wave is of negative polarity and the second half-wave is of positive polarity, said circuit comprising means for amplifying said input signals, means for applying to said voltmeter a voltage proportional to the peak of said first half-wave pulse, and means for rendering said amplifying means incapable of applying the voltages from subsequent pulses to said voltmeter said later means being responsive to receipt of the first positive pulse following the initial receipt of said negative pulse.

2. In combination with a vacuum tube voltmeter, a circuit responsive to input pulse signals of alternate polarity in which the first half-wave is of negative polarity and the second half-wave is of positive polarity, said circuit comprising means for amplifying said input signals, means for applying to said voltmeter a voltage proportional to the peak of said first half-wave pulse, means for rendering said amplifying means incapable of applying the voltages from subsequent pulses to said voltmeter, said later means being responsive to the first positive pulse following said initial negative pulse, and means including a switch for placing the circuit in an operative position.

3. In combination, a condenser, pulse receiving means including an amplifying stage operable to receive input pulse signals of alternate polarity, the initial pulse of which is a negative pulse and to charge said condenser to a potential proportional to the peak voltage of said negative pulse, a vacuum tube voltmeter for indicating the condenser charge, biasing means operative upon receipt of a positive pulse subsequent to said initial negative pulse for rendering the amplifying stage inoperative by applying a cut-off bias thereto and means to prevent the generation of an internal negative pulse by said biasing means when said amplifying stage is rendered inoperative.

4. In combination, a condenser, pulse receiving means including a two-stage amplifier operable to normally receive an initial negative pulse and charge said condenser to a potential proportional to the peak value of said negative pulse, a vacuum tube voltmeter for indicating the condenser charge, biasing means operative upon receipt of a positive pulse subsequent to said initial negative pulse for rendering one of the amplifying stages incapable of applying voltages from subsequent pulses to said condenser by applying a cut-off bias thereto and for preventing internal negative pulse generation in said stage by the operation of said biasing means, and switch means for resetting the pulse receiving means for normal operation.

5. A circuit responsive only to alternating current input signals in which the first half-wave is of negative polarity, said circuit comprising a two-stage amplifier, a rectifier, a condenser, an eliminating network, a gas tube, a switch and a suitable vacuum tube voltmeter, said circuit being so operable that, on receipt of an initial negative pulse by said amplifier, said condenser is charged through said rectifier from said amplifier to a potential proportional to the peak of said initial negative pulse, said potential being then applied to said voltmeter, said circuit being additionally operative so as on receipt of the positive pulse following said initial negative pulse to trigger said gas tube thereby negatively biasing one of said amplifying stages which renders said circuit incapable of applying additional charges to said condenser from subsequent pulses, said eliminating network being provided to prevent, on cutoff, the formation of an additional negative pulse by the negative bias from said gas tube, and said switch being for resetting the circuit in an operative position by discharging said condenser and deionizing said gas tube.

6. In combination with a vacuum tube voltmeter, a circuit responsive to alternating current input pulse signals in which the first half-wave is of one polarity and the second half-wave is of opposite polarity, said circuit comprising means for amplifying said input signals, means for applying to said voltmeter a voltage proportional to the peak of said first half-wave pulse, and means for rendering said amplifying means inoperative to prevent application to said voltmeter of subsequent pulses applied to said amplifying means, said last means being responsive to receipt of said second half-wave pulse.

7. The combination of claim 6 having means including a switch for returning the circuit to operative condition.

8. The combination of claim 6 having means to prevent the generation of an internal negative pulse in said circuit when said amplifying stage is rendered inoperative.

9. The combination of claim 6 in which the means for rendering said amplifying means inoperative comprises a gas-filled tube triggered by said second half-wave pulse and connected to said amplifying means to bias it to cut-off condition.

MICHAEL J. BURGER.
RUSSELL W. COLLINS.
ARTHUR S. COSLER, Jr.

REFERENCES CITED

The following references are of record in the file of this patent:

UNITED STATES PATENTS

| Number | Name | Date |
|---|---|---|
| 1,611,716 | Brown | Dec. 21, 1926 |
| 2,014,102 | Conklin | Sept. 10, 1935 |
| 2,323,762 | George | July 6, 1943 |
| 2,337,522 | Eldredge | Dec. 21, 1943 |
| 2,350,545 | Bradford | June 6, 1944 |
| 2,377,903 | Rieber | June 12, 1945 |
| 2,378,846 | Hansell | June 19, 1945 |

OTHER REFERENCES

"Vacuum Tube Voltmeters," by John F. Rider, John S. Rider Publisher Inc., 1941, pages 72 and 73, Figures 5-3. (Copy in Division 69.)